APPARATUS FOR MIXING COLORANT IN GLASS FURNACE FOREHEARTH
Filed April 17, 1956 5 Sheets-Sheet 1
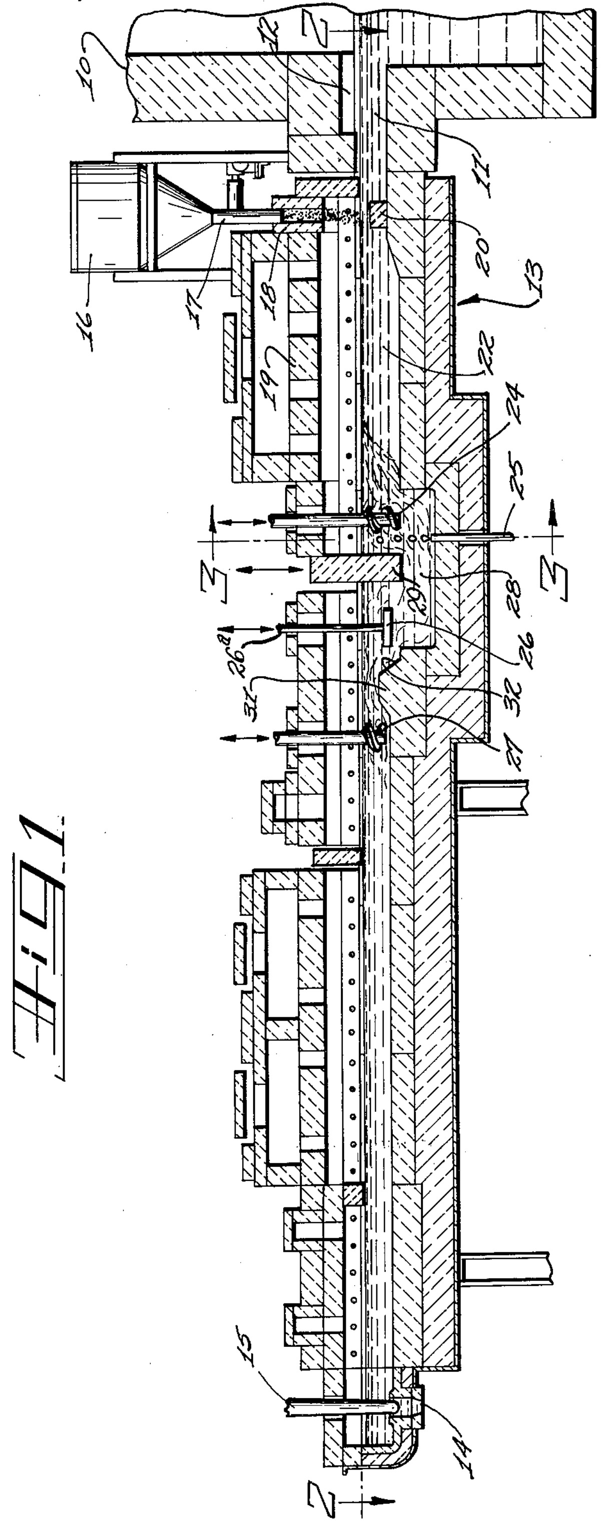
INVENTORS
ROBERT R. ROUGH
ARTHUR B. SWAIN JR.
BY Rule and Hoge,
ATTORNEYS APPARATUS FOR MIXING COLORANT IN GLASS FURNACE FOREHEARTH
Filed April 17, 1956 5 Sheets-Sheet 2
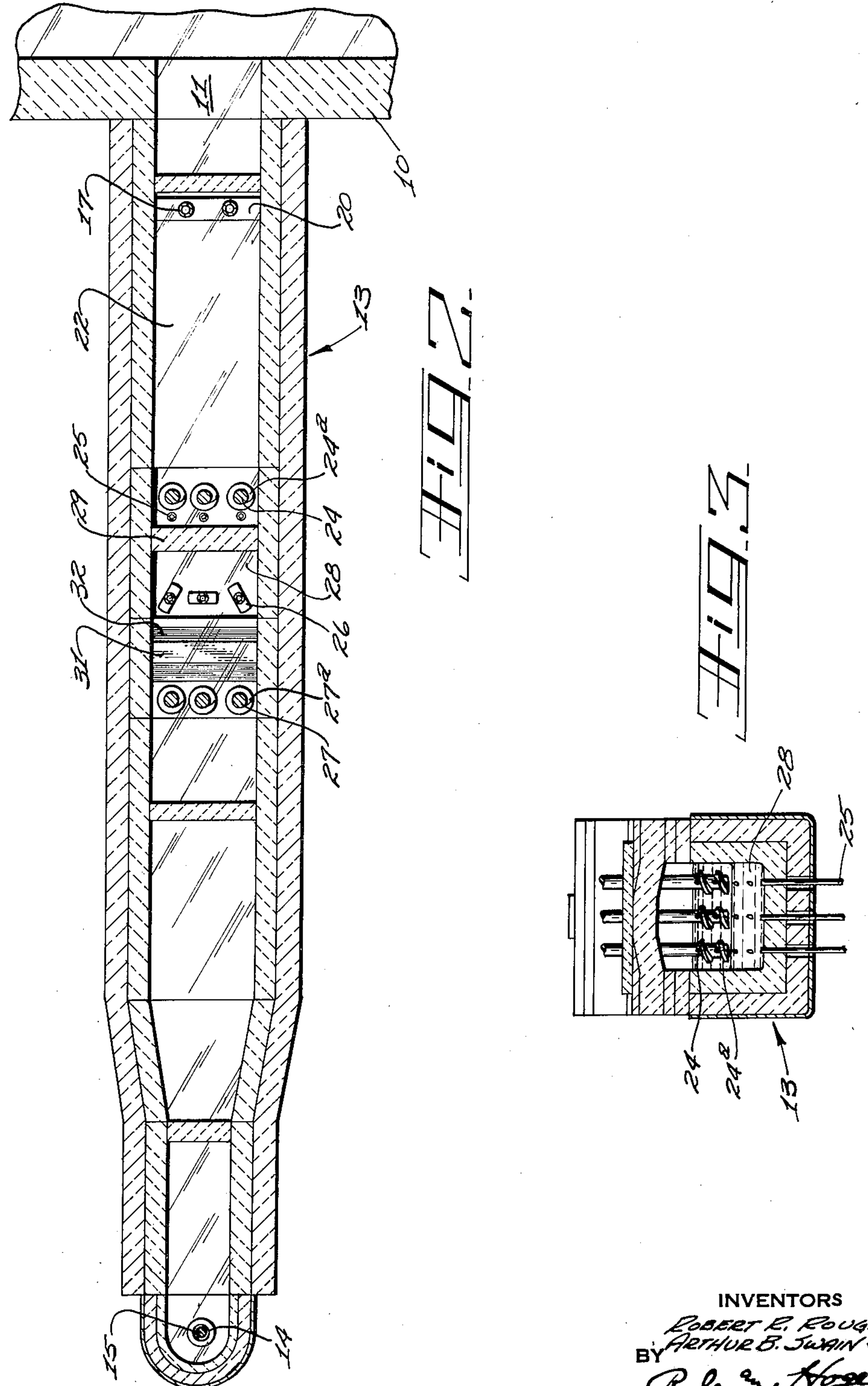
INVENTORS
ROBERT R. ROUGH
ARTHUR B. SWAIN JR.
BY Rule and Hoge
ATTORNEYS APPARATUS FOR MIXING COLORANT IN GLASS FURNACE FOREHEARTH
Filed April 17, 1956 5 Sheets-Sheet 3
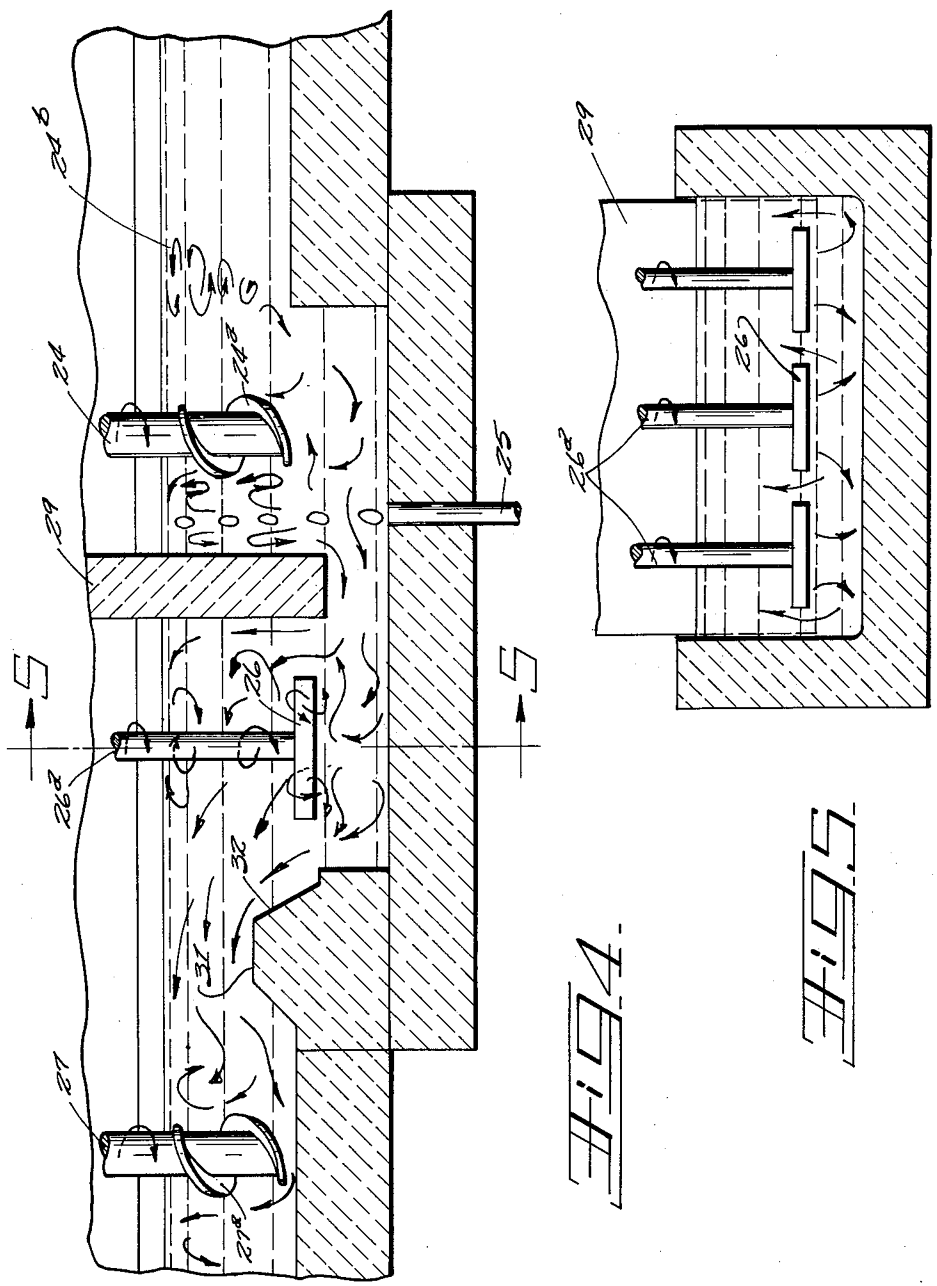
INVENTORS
ROBERT R. ROUGH,
ARTHUR B. SWAIN JR.
BY
Rule & Hoge.
ATTORNEYS

APPARATUS FOR MIXING COLORANT IN GLASS FURNACE FOREHEARTH

Filed April 17, 1956 5 Sheets-Sheet 4

INVENTORS
ROBERT R. ROUGH
ARTHUR B. SWAIN JR.
BY
Rule and Hoge
ATTORNEYS

APPARATUS FOR MIXING COLORANT IN GLASS FURNACE FOREHEARTH

INVENTORS
ROBERT R. ROUGH
ARTHUR B. SWAIN Jr.
BY
Rule and Hoge.
ATTORNEYS

United States Patent Office 3,057,175

Patented Oct. 9, 1962

1

3,057,175

APPARATUS FOR MIXING COLORANT IN GLASS FURNACE FOREHEARTH

Robert R. Rough and Arthur B. Swain, Jr., Toledo, Ohio, assignors to Owens-Illinois Glass Company, a corporation of Ohio Filed Apr. 17, 1956, Ser. No. 578,632
9 Claims. (Cl. 65—178)

Our invention relates to methods and apparatus for melting and refining glass and particularly to apparatus of a type in which molten glass is discharged from a melting and refining tank and caused to flow through a channel or forehearth to the point at which the glass is withdrawn and formed into useful products. In apparatus of this type, a frit comprising a colorant, and/or other materials for modifying the composition and working characteristics of the glass, may be introduced into the flowing glass as the latter is discharged from the melting and refining tank and then mixed with the glass during its flow through the forehearth. For example, the addition of ½% of CaO or $Na_2O$ may be added in pelletized glassy form to respectively increase or decrease the setting rate of the molten glass in the molds of the forming machine. Such addition may be added along with the colorant frit or may be merely added to the uncolored glass for the control of the physical characteristics of the glass. In the use of such apparatus difficulty has been experienced in obtaining the thorough mixing of the frit or colorant with the glass from the main tank which is necessary to obtain a homogeneous glass of uniform color throughout. Thorough mixing is particularly difficult when high tonnage of molten glass is being drawn from a feeder. For example, if tonnage in the neighborhood of fifty tons per day is drawn through a feeder forehearth, the rate of travel of the glass through an unobstructed channel is so very rapid that considerable streaking of color is obtained rather than complete homogeneity thereof. This streaking condition is due to the fact that the molten glass moves through the frit melting zone portion of the feeder and through the stirring portions thereof at a rate entirely too fast to permit the thorough stirring necessary to obtain the desired homogeneity and uniformity of color. Therefore, the primary object of this invention is to provide means whereby the rate of travel of the glass through the channel may be regulated and controlled and the length of holding time in the mixing and stirring areas may be controlled and regulated in accordance with a desired rate of travel of the glass in the forehearth channel.

A further object of the present invention is to provide a specially constructed forehearth, stirring apparatus and cooperating means for thoroughly mixing the constituents during their passage through the foreharth. The preferred form of apparatus includes means for introducing the frit at a controlled rate into the forehearth adjacent the outlet of the melting and refining tank. The frit, which may be a highly enriched glass frit chemically compatible with the glass in the main tank, is discharged at a controlled rate from a frit feeder and evenly spread over the surface of the flowing glass. The frit, containing the colorant, enters the forehearth directly over a dam and passes through a melting chamber or section of the forehearth channel within which the frit is melted and brought to a set of stirrers by which the colorant is partially mixed with the base glass from the main tank. The glass then passes into a specially constructed well section of the forehearth. Here the glass is additionally stirred by means of a bubbler and then passes underneath a deep skimmer block within the well. After passing beneath the deep skimmer block the glass is further mixed by another stirring device. The glass then passes out of the well and upwardly over a specially constructed dam and is then subjected to a final mixing operation by a third set of stirrers. After this mixing the glass travels through the usual cooling and conditioning section of the forehearth.

A further object of the invention is to provide a novel method of stirring the glass by means of a stirring element immersed in the glass and rotatable about a vertical axis at a sufficiently high speed to create a vortex and draw the surface glass downwardly in opposition to the general upward trend of the flow within the vicinity of such stirring element.

A further object of the invention is to provide a novel form of stirring apparatus for use in practicing the above method.

Other objects of the invention will appear more fully hereinafter.

Referring to the accompanying drawings:

FIG. 1 is a longitudinal sectional elevation of a preferred form of apparatus for use in practicing our invention.

FIG. 2 is a sectional plan view at the line 2—2 on FIG. 1.

FIG. 3 is a cross sectional view at the line 3—3 on FIG. 1.

FIG. 4 is a longitudinal sectional elevation of an intermediate portion of the forehearth, on a comparatively large scale.

FIG. 5 is a section at the line 5—5 on FIG. 4.

Figure 6:
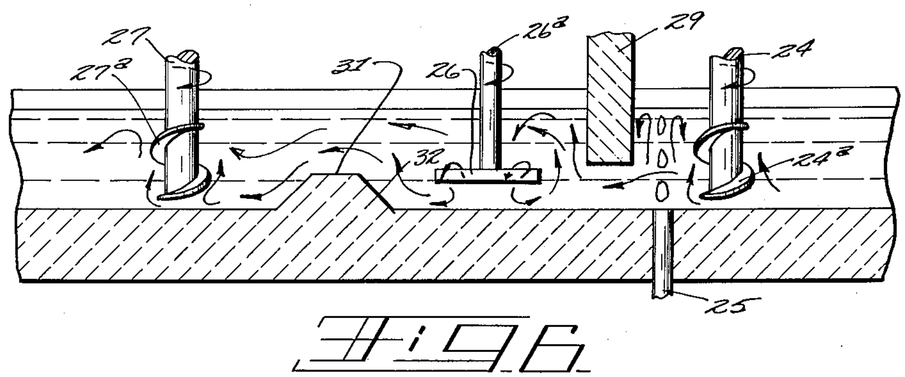
FIG. 6 is a view similar to FIG. 4 showing a modification in which the well is omitted.

The base glass is melted and refined in the furnace tank 10. The molten glass 11 flows through the furnace outlet 12 into the channel provided by the forehearth 13. The forehearth is provided at its forward end with an outlet 14 or other means for the discharge of the glass which may be under the control of a plunger 15. This plunger may be operated to control the volume of glass passing through the outlet 14 either by adjustment with respect to the outlet to control the flow therethrough, or by reciprocation thereover to discharge gobs of glass therethrough.

When the invention is used for supplying a colored glass a highly enriched glass frit comprising the colorant is fed to the forehearth from a frit feeding device such as disclosed in the copending application of Albert G. Lauck, U.S. Patent No. 2,926,458, issued March 1, 1960, for Colored Glass Frit Feeder. The coloring material is fed to the surface of the glass in the forehearth channel from a feeder tank 16 through the discharge spouts 17. Discharge blocks 18, built into the upper wall or roof 19 of the forehearth, are formed with vertical channels in register with the spouts 17 through which the frit falls by gravity into the forehearth. The frit, which is in powdered or granulated form is spread over the surface of the flowing glass. The frit falls on to the glass directly over a dam 20 of Zac or other refractory material. The dam serves to produce a comparatively rapid local surface flow of the glass which aids in distributing the frit, spreading it evenly over the surface of the glass.

The forehearth comprises a section or chamber 22, herein referred to as the colorant chamber, through which the frit is carried and in which it is melted. This chamber or compartment 22 is isolated from the balance of the forehearth insofar as heating is concerned. It is necessary to carry sufficient temperature in the chamber 22 to melt the colorant and as a usual procedure a temperature at least equal to that in the refiner is required. However, means are provided for increasing the temperature beyond that of the refiner for insuring the melting of the frit colorant. Additionally, the heating means is adapted to be controlled in order that either an oxidizing or non-oxidizing heating condition may be obtained. In practice the glass in the chamber 22 is usually raised to a higher temperature than that issuing from the tank 10. For example, an average temperature of about 2280° F. is maintained in the tank 10 and the temperature in the forehearth chamber 22 is generally of the order of about 2350° F. In the well section 28 the temperature is generally lowered approximately 50° by the water cooled stirring members 26 and from this point on the glass is gradually cooled to an average operating temperature at the outlet 14 of about 2070° F. Obviously the optimum temperatures will vary to some extent with variations in the glass compositions. Means for effecting a thorough mixing of the melted frit, containing the colorant, with the base glass from the tank 10 includes a first set of stirrers 24, bubblers 25, a second set of stirrers 26 and a third set of stirrers 27. The forehearth is formed with a well 28 and a deep well skimmer 29 extending downward within the well.

The glass as it passes from the melting compartment 22 into the well 28 is stirred by the first set of stirrers 24 which partially mix the glass constituents. These stirrers as shown comprise spiral stirring blades which are rotated at comparatively high speed about their vertical axes, for example, 23 revolutions per minute. The rotation of the stirrers is in a direction to exert an upward pressure on the glass entering the well 28. The stirrers 24 are provided with right-hand screw threads, as shown in FIGS. 1 and 4, and are rotated in a right-hand direction, thus exerting an upward pull on the surrounding glass. The effect of this stirring action is to produce a rotary circulation of the surface glass surrounding the stirrers, assisting in mixing the colorant or frit glass with the glass from the main tank and spreading this mixture around the stirrers. We have found also that the stirrers 24 cause a localized rotary circulation of the glass approaching the stirrers, as indicated by the arrows at 24^b^ (FIG. 4). This circulating glass is gradually drown from the surface downward into the well before being drawn upward by the stirrers. We have found that when the stirrers 24 are rotated at a speed of 20 r.p.m. or above, they serve as a barrier which prevents any substantial surface flow of the glass past the stirrers. Accordingly the glass is compelled to flow downward into the well and beneath the stirrers. The flow of the body of glass as a whole lengthwise through the forehearth channel compels a gradual downward flow of such surface mixture during the passage through the well and beneath the deep skimmer block 29. The glass as it reaches the area of the stirrers 24 is further stirred by means of the bubblers 25 extending through the forehearth floor and to which air or gas is supplied and bubbles up through the glass. The bubblers provide not only a means of stirring the glass, but in addition, provide a means of controlling the passage or rate of travel of the glass through the length of the forehearth. The glass then passes beneath the skimmer block 29 which is adapted for vertical adjustment (see vertical, reciprocal arrows, FIG. 1) to thereby provide variation of the length of the path of travel of the glass along the forehearth channel. The total combined result of the operation of the members 24, 25, and 29 in their cooperative relation is to permit control of the length of time and rate of travel of the glass through the melting compartment 22. Thus, for example, by increasing the speed of rotation of the stirrers 24, the rate of bubbling and the depth of penetration of the block 29, the time interval required for the passage of the glass through the compartment 22, may be lengthened. Conversely by decreasing the speed of stirring and bubbling and the depth of penetration of block 29 the said time interval may be shortened in some proportion to the degree of decrease of speed of the implements.

After passing beneath the skimmer block 29, the glass is subjected while still within the well 28 to another stirring operation by means of the stirrers 26. These stirrers 26 preferably comprise horizontal bars or stirring elements attached to the lower ends of stirring rods 26^a^ extending downward through openings in the roof of the forehearth. The stirrers 26 may consist of Inconel metal and may be constructed to permit the circulation therethrough of a cooling fluid by which overheating is prevented. We have found that a metal stirrer, water cooled can be rotated at a much higher speed than one made of the usual refractory material. Such a water cooled stirrer has been operated satisfactorily at speeds in excess of 100 r.p.m.

The high speed rotation of each stirrer 26, with the stirring blade immersed in the glass and positioned at a level intermediate the top and bottom surface of the body of glass, provides a substantially novel method of stirring and homogenizing the glass. The high speed rotation of the stirrer creates a vortex by which the surface portion of the glass immediately surrounding the stem 26^a^ and extending outwardly for a substantial distance from the stem, is drawn inwardly and carried downwardly substantially in the form of a sleeve or layer of glass surrounding and in contact with the stem. This downward movement of the glass at and in the immediate vicinity of the axis of rotation is extended below the stirrer blade and carries the glass substantially to the floor of the well. This glass is deflected by the floor and forms thereby an inverted umbrella shape which spreads through approximately the full width of the channel of the forehearth. This mixed glass is then impelled upwardly and drawn over the dam 31 by the general flow of the glass through the forehearth. This method of mixing the glass is found to be effective, producing a homogeneity not obtainable by prior art methods of mixing within a forehearth.

Each of the three sets of stirrers 24, 26 and 27, preferably comprises a plurality of vertical stirring rods arranged in a row extending transversely of the forehearth channel. These stirrers are also arranged for vertical adjustment (see vertical, reciprocal arrows, FIG. 1) to thereby provide control of the depth of penetration of the stirring action. The rods comprised in the stirrers 24 and 27 are provided with spiral blades 24^a^ and 27^a^ respectively. The bubblers 25 comprise vertical tubes extending through the floor of the well 28, the tubes being arranged in a row extending transversely of the channel. The bubblers in the form of apparatus shown in FIGS. 1 to 4 are positioned immediately beyond the stirrers 24, downstream from the stirrers and in a vertical plane in close proximity to that of the stirrers 24 so that the air or gas discharged through the bubblers is distributed in sheet formation immediately beyond the stirrers 24.

After passing the stirrers 26 the glass flows upwardly to and over a dam 31 which extends upwardly a short distance above the adjoining floor level (FIGS. 1 and 4). The front wall of the well section 28 is formed with an upwardly and forwardly inclined surface 32 forming the rear wall surface of the dam 31. The front wall surface of the dam 31 is downwardly and forwardly inclined, directing the glass forwardly and downwardly to the third set of stirring devices 27 by which the final stirring and mixing are effected. It appears that the reduction in the depth of glass over the dam 31 provides a condition whereby the total cross-sectional area of the glass over the dam becomes completely saturated with color. As the colored glass leaves the dam, the channel depth abruptly increases and the stirrers 27 positioned after the dam, act not only to further insure complete homogeneity of color, but also to spread this colored glass both vertically and horizontally. Thus, the flow of colored glass over and from the dam becomes channel width and depth as it leaves this point and flows to the discharge outlet 14 at the front end of the forehearth. After these stirring and mixing operations the resultant colored glass travels forward through the cooling and conditioning section of the forehearth and is withdrawn or discharged through the feeder outlet 14.

The primary purpose of the well section 28 is to provide for a comparatively slow movement of the body of glass as a whole and thereby giving adequate holding time to permit thorough mixing of the color with the base glass. The bubblers 25 in the well section aid in providing an effective surface-to-bottom glass mixing, the mixing operation being effective throughout the entire depth of the glass. The skimmer block 29 is effective for forcing the surface portions of the glass downward so that the same may be thoroughly mixed with the rest of the glass in the forehearth. This serves to counteract any tendency of the more highly colored glass to remain at the surface. The dam 31 which is just downstream from the well section is located between the two sets of stirring mechanisms, namely, stirring devices 26 and 27, with the dam 31 immediately adjoining the well. This arrangement provides for a thorough bottom-to-surface mixing of the glass, resulting in a thorough dispersal and uniform mixing of the colorant material.

FIG. 6 shows a modified form of forehearth in which the well is omitted, the floor of the forehearth being at the same level on both sides of the dam 31. The general direction of flow of the glass under the control of the stirrers is indicated by the arrows. The stirring apparatus as shown in this view is well adapted for mixing some types of glass compositions and coloring materials.

Figure 7:
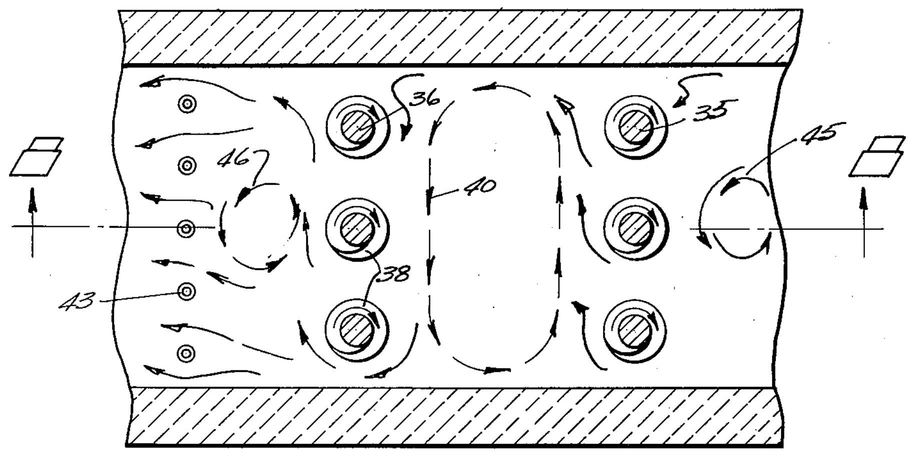
FIG. 7 is a sectional plan view of a further modification.
Figure 8:
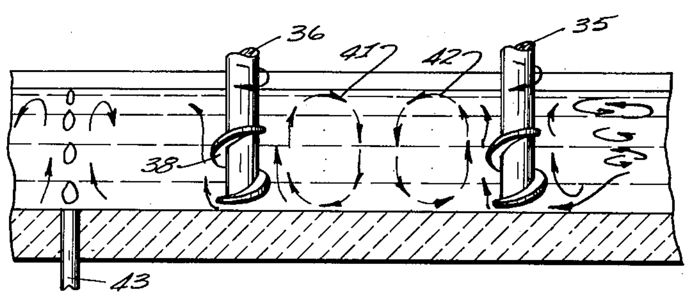
FIG. 8 is a section at the line 8—8 on FIG. 7.

FIGS. 7 and 8 illustrate a modification in which two rows of stirrers 35 and 36 extend transversely of the forehearth and are spaced apart in a direction lengthwise of the forehearth without any intermediate means for controlling the circulation. These stirrers, as indicated by the arrows, are all provided with spiral blades 38 or screw threads. The stirrers are all rotated in a right-hand or clockwise direction as viewed in FIG. 7. With this arrangement the horizontal components of the pull or drag on the glass by the two rows of stirrers is in opposite directions, so that there is produced a circulation of the glass between the two rows of stirrers in a closed path and in a counter-clockwise direction as indicated by the arrows 40. In addition to this circulation which is in a generally horizontal direction there is also generated a circulation of the glass as indicated by the arrows 41 and 42 (FIG. 8). As here indicated by the arrows the rotation of the stirrers applies an upward force to the glass immediately surrounding the stirrers so that there is an upward flow extending substantially from the floor of the forehearth to the surface of the glass, the glass which is drawn upwardly by the stirrers being returned in the closed paths indicated by the arrows 41, 42. The glass is gradually drawn forward beyond the stirrers 35, 36 and then subjected to the further action of the bubblers 43 arranged in a row extending across the forehearth at a position in advance of the stirrers 36. We have found that the operation of the stirrers 35 and 36 also produces localized rotary circulation of the glass as indicated by the arrows 45 and 46.

Figure 9:
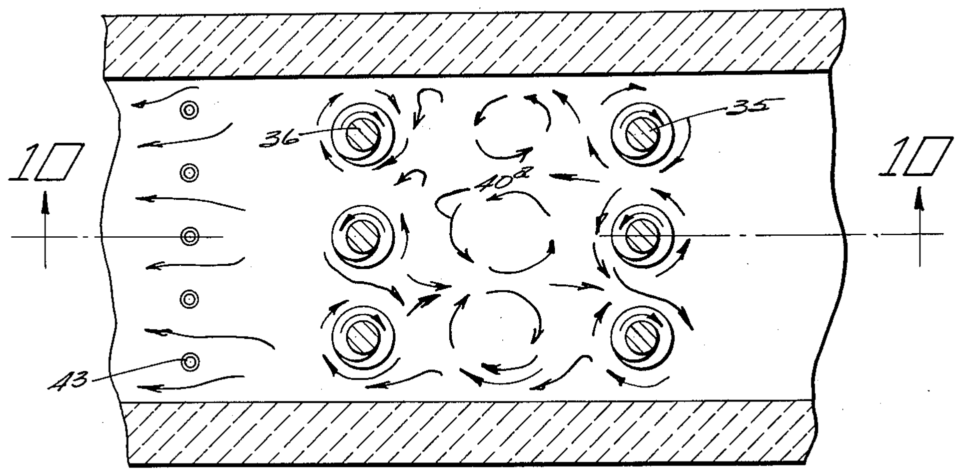
FIG. 9 is a view similar to FIG. 7, but showing the rotation of certain of the stirrers reversed.
Figure 10:
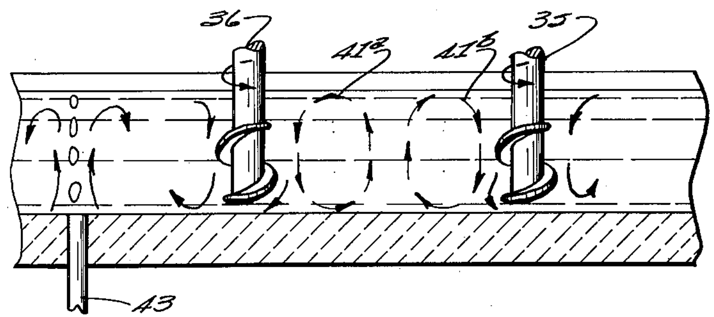
FIG. 10 is a section at the line 10—10 on FIG. 9.

FIGS. 9 and 10 show a construction substantially similar to that of FIGS. 7 and 8 except that the stirrers 35 and 36 are not all rotated in the same direction. The outer stirrers in each row as shown by the arrows rotate in a clockwise direction while the intermediate stirrers rotate counterclockwise. This tends to produce a localized circulation of the glass between the two rows in a clockwise direction in a closed path as indicated by the arrows 40[a]. The intermediate stirrers being rotated counterclockwise, the right-hand threads thereon exert downward pressure on the adjoining glass so that a local circulation is produced between the rows of stirrers in closed paths as indicated by the arrows 41[a] and 41[b].

The rate of bubbling and the speed of rotation of the stirrers may be varied to suit any desired operating condition. For example, both the rate of bubbling and the speed of rotation may be increased to provide increased resistance to the rate and volume of flow of glass through the well 28 or conversely the rate may be lowered to lessen said resistance.

Modifications may be resorted to within the spirit and scope of the appended claims.

We claim:

1. In an apparatus for mixing colorant with molten glass, said apparatus having a substantially horizontally disposed channel through which the colorant and molten glass are caused to flow and an intermediate portion of said channel formed to provide a well extending downward below the adjoining floor level, and a means for adding said colorant upstream of said well, the combination with a skimmer block extending downwardly within the well into the molten glass, stirring means positioned in the well and extending into molten glass therein between said skimmer block and the side of the well at which molten glass enters the well, said stirring means having means for applying a predominantly upwardly directed force for retarding the flow of molten glass through the well and for mixing the colorant and molten glass by causing a flow of glass from a lower level to an upper level in the well, and a second stirring means in the molten glass downstream from the skimmer block.

2. The apparatus defined in claim 1, in which the first-mentioned stirring means includes a rotary spiral-bladed stirrer.

3. The apparatus defined in claim 2, in which said first-mentioned stirring means includes a plurality of said stirrers arranged in a row transversely across the channel.

4. The apparatus defined in claim 1, in which the second stirring means is positioned in the well and extends into molten glass therein between said skimmer block and the side of the well at which molten glass leaves the well, said apparatus including a third stirring means in molten glass within the channel at a position downstream from the well, and a dam in the channel interposed between said third stirring means and the well.

5. The apparatus defined in claim 4, the said dam having an upstream wall surface closely adjacent to said side of the well at which molten glass leaves the well, said third stirring means being positioned in close proximity to said dam at the downstream side thereof.

6. The apparatus defined in claim 1, in which the second stirring means is positioned in the well and extends into molten glass therein between said skimmer block and the side of the well at which molten glass leaves the well.

7. The apparatus defined in claim 6, in which the skimmer block and said first and second stirring means are adjustable up and down in the well.

8. The apparatus defined in claim 1, said apparatus including a dam across the floor of the channel and positioned beneath the means for adding the colorant at the point at which the colorant enters the channel, said dam having its upper surface a short distance below the surface of molten glass flowing thereover.

9. In an apparatus for mixing colorant with molten glass, said apparatus having a substantially horizontally disposed channel through which the colorant and molten glass are caused to flow and an intermediate portion of said channel formed to provide a well extending downward below the adjoining floor level, and a means for adding said colorant near the upstream end of said channel, the combination with a skimmer block extending downwardly within the well into the molten glass, and stirring means positioned in the well and extending into the molten glass therein between said skimmer block and the side of the well at which the glass enters the well, said stirring means applying a predominantly upwardly directed force for retarding the flow of molten glass through the well and for mixing the colorant and molten glass by causing a flow of glass from a lower level to an upper level in the well, said stirring means comprising a rotary, spiral-bladed stirrer and means in the well and extending into the lower level of molten glass in the well for introducing gas into the molten glass.

References Cited in the file of this patent

UNITED STATES PATENTS

| | | |
|---|---|---|
| 2,115,408 | Brosse | Apr. 26, 1938 |
| 2,387,222 | Wright | Oct. 16, 1945 |
| 2,467,809 | Cannon et al. | Apr. 19, 1949 |
| 2,586,079 | Peiler | Feb. 19, 1942 |
| 2,593,197 | Rough | Apr. 15, 1952 |
| 2,616,221 | Hanson | Nov. 4, 1952 |
| 2,641,454 | Labino | June 9, 1953 |
| 2,746,729 | Eskins | May 22, 1956 |
| 2,762,167 | De Voe | Sept. 11, 1956 |
| 2,817,191 | Hamilton | Dec. 24, 1957 |
| 2,888,781 | Fraser | June 2, 1959 |